US008683507B2

(12) United States Patent
Lee et al.

(10) Patent No.: US 8,683,507 B2
(45) Date of Patent: Mar. 25, 2014

(54) METHOD AND APPARATUS FOR REPRODUCING MOVING IMAGE ACCORDING TO PARENTAL LEVEL IN USER APPARATUS

(75) Inventors: Jae-Min Lee, Seoul (KR); Hye-Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 12/254,660

(22) Filed: Oct. 20, 2008

(65) Prior Publication Data

US 2009/0106789 A1 Apr. 23, 2009

(30) Foreign Application Priority Data

Oct. 23, 2007 (KR) .................. 10-2007-0106379

(51) Int. Cl.
 *H04N 7/16* (2011.01)
 *H04N 9/80* (2006.01)
(52) U.S. Cl.
 USPC ............. 725/28; 725/25; 725/27; 725/29; 725/30; 725/31; 386/261

(58) Field of Classification Search
 USPC ........................ 725/25–28; 386/261
 See application file for complete search history.

(56) References Cited

U.S. PATENT DOCUMENTS

| 4,873,585 | A | * | 10/1989 | Blanton et al. | ............... 386/353 |
| 6,091,886 | A | | 7/2000 | Abecassis | |
| 6,151,444 | A | * | 11/2000 | Abecassis | ............... 386/206 |
| 2004/0250272 | A1 | * | 12/2004 | Durden et al. | ............... 725/25 |
| 2006/0190962 | A1 | * | 8/2006 | Kim | ............... 725/25 |

FOREIGN PATENT DOCUMENTS

| EP | 1 388 862 A1 | 2/2004 |
| KR | 10-2005-0091921 A | 9/2005 |
| KR | 10-2006-0086463 A | 7/2006 |
| WO | 97/23996 A1 | 7/1997 |

* cited by examiner

*Primary Examiner* — Pankaj Kumar
*Assistant Examiner* — Alazar Tilahun
(74) *Attorney, Agent, or Firm* — Jefferson IP Law, LLP

(57) ABSTRACT

A method and an apparatus for reproducing a moving image according to a parental level are provided. In the method, a video frame stream is digital-processed, so that frames are detected. Whether a parental level is set in each detected frame is determined. When the parental level is set, a frame sequence number of a frame to be reproduced next is determined using a next frame sequence number set in the frame.

12 Claims, 3 Drawing Sheets

METHOD AND APPARATUS FOR REPRODUCING MOVING IMAGE ACCORDING TO PARENTAL LEVEL IN USER APPARATUS

PRIORITY

This application claims the benefit under 35 U.S.C. §119(a) of a Korean patent application filed in the Korean Intellectual Property Office on Oct. 23, 2007 and assigned Serial No. 2007-106379, the entire disclosure of which is hereby incorporated by reference.

BACKGROUND OF THE INVENTION

1. Field of the Invention

The present invention relates to a method and an apparatus for reproducing a moving image according to a parental level in a user apparatus. More particularly, the present invention relates to a method and an apparatus for reproducing moving image content according to various parental levels in a user apparatus.

2. Description of the Related Art

As apparatuses for reproducing or recording image signals increase in popularity, and as image mediums develop, such as a television, a video, a Compact Disk (CD), and a Digital Versatile Disc (DVD), viewing of an image through an image medium becomes increasingly easy.

Image information recorded on and distributed through these image recording media contains various image information that is appropriate for a particular age group. Among the information, image material for adult use may contain content that is not appropriate for users below a parental level. Therefore, it is necessary to institute a policy to limit viewing of the inappropriate image material by users below a parental level.

More particularly, the "Image Material Rating Committee" limits a distribution object by determining a rating to limit viewing of an image material or a sales object according to content recorded on an image recording medium.

Users check a parental level of an image medium and view the image medium. However, determining a rating for an image material is only one way of blocking distribution to specific users, and it is substantially difficult to prevent users from viewing an image material above a corresponding rating.

For example, while viewing cable TeleVision (TV) and satellite digital broadcasting, a set-top box applies a viewing code provided by an Electronic Program Guide (EPG) to judge whether to reproduce a program or whether a program is reproducible. However, for cable TV and satellite digital broadcasting that does not use the set-top box, it is difficult to judge whether a program should be reproduced based on a parental level provided by the EPG.

For another example, an apparatus such as a DVD player, a Portable Multimedia Player (PMP), and a smart phone compares a parental level of a moving image with a parental level set by a user when the moving image is initially reproduced to judge whether to reproduce the moving image. In the case of checking the parental level when the moving image is initially reproduced, only a portion of the moving image is reproduced or reproduction itself of the moving image is not performed.

For still another example, a parental level included in image signals is detected, so that reproduction is performed with images above a relevant parental level blacked out, muted, or mosaic-processed. However, such incomplete reproduction cannot maintain continuity of a corresponding moving image, so that inconvenience is generated to a user viewing the moving image.

In addition, since all of the above-described methods operate according to one parental level, a manufacturer of a moving image should manufacture and distribute the moving image according to the one parental level, and a viewer of the moving image has a limitation of having to view the moving image according to the one parental level.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for reproducing a moving image according to a parental level.

Another aspect of the present invention is to provide a method and an apparatus for setting a parental level for each frame in a header of a moving image frame.

Still another aspect of the present invention is to provide a method and an apparatus for reproducing a frame of a relevant parental level according to the parental level and a next frame sequence number set in a header of a moving image frame.

Yet another aspect of the present invention is to provide an apparatus and a method for reproducing one content according to various parental levels.

According to an aspect of the present invention, an apparatus for reproducing a moving image according to a parental level is provided. The apparatus includes a digital processor for digital-processing a video frame stream to detect frames, a parental level detector for determining whether a parental level is set in each detected frame, and when the parental level is set, determining a frame sequence number of a frame to be reproduced next using a next frame sequence number set in the frame.

According to another aspect of the present invention, a method for reproducing a moving image according to a parental level in a user apparatus is provided. The method includes digital-processing a video frame stream to detect frames, determining whether a parental level is set in each detected frame, and when the parental level is set, determining a frame sequence number of a frame to be reproduced next using a next frame sequence number set in the frame.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Hereinafter, exemplary embodiments of the present invention will describe a method and an apparatus for reproducing one moving image content according to various parental levels.

Figure 1:
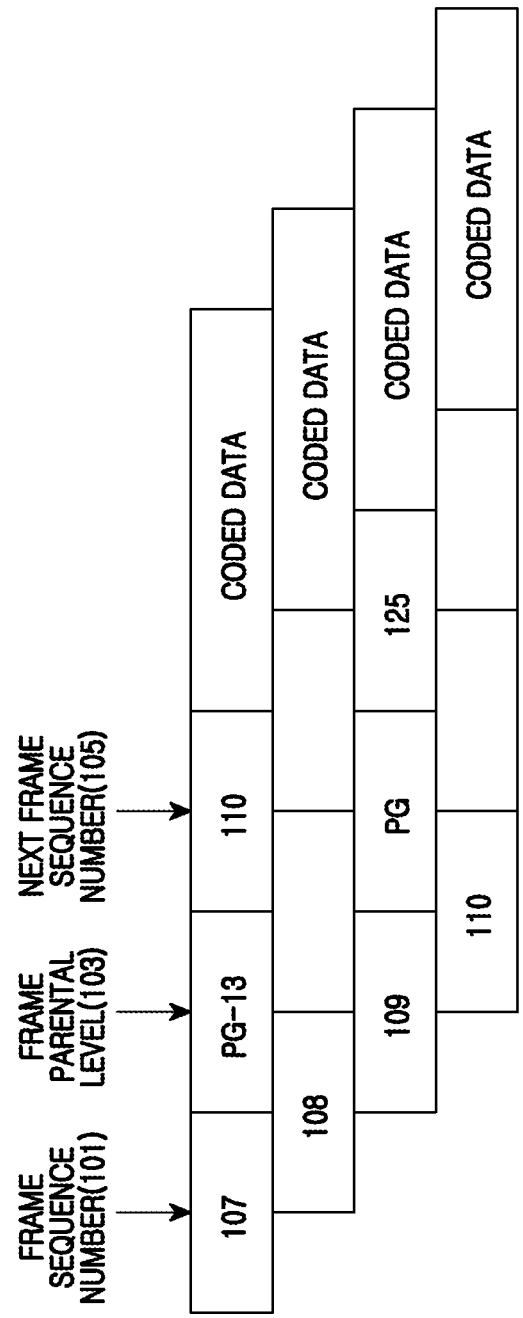
FIG. 1 is a view illustrating a frame structure for setting a parental level for each frame according to an exemplary embodiment of the present invention.

FIG. 1 is a view illustrating a frame structure for setting a parental level for each frame according to an exemplary embodiment of the present invention Referring to FIG. 1, each of the frames forming a moving image content includes a frame sequence number field 101, a frame parental level field 103, a next frame sequence number field 105, and coded data. Here, the frame sequence number field 101, the frame parental level field 103, and the next frame sequence number field 105 correspond to a header of the frame.

The frame sequence number field 101 is a unique number field of a frame.

The frame parental level field 103 is a field where a parental level is set. Here, the parental level can be classified as in Table 1.

TABLE 1

| Parental level | Description |
|---|---|
| G | All ages admitted |
| PG | Underage guided by parents |
| PG-13 | Child at age of 13 or more accompanied by parents |
| R | Child at age of 16 or more accompanied by parents |
| NC-17 | No child under 17 |
| X | For adult use |

The next frame sequence number field 105 informs of a frame sequence number of a frame to be reproduced next when a parental level is set in the frame parental level field 103. When the frame parental level field 103 is empty, the next frame sequence number field 105 remains empty.

Figure 2:
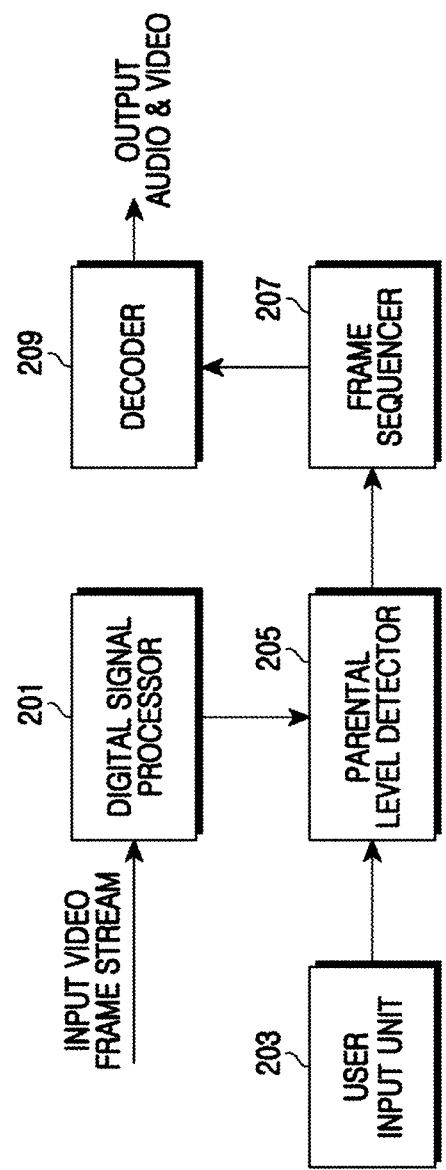
FIG. 2 is a block diagram of a user apparatus for reproducing a moving image based on a parental level according to an exemplary embodiment of the present invention.

FIG. 2 is a block diagram of a user apparatus for reproducing a moving image based on a parental level according to an exemplary embodiment of the present invention. Here, the user apparatus is a terminal that can reproduce a moving image content. Examples of the user apparatus include a set-top box, a DVD player, a PMP, a smart phone, a communication terminal, a satellite broadcasting receiver and the like.

As illustrated in FIG. 2, the user apparatus can include a digital signal processor 201, a user input unit 203, a parental level detector 205, a frame sequencer 207, and a decoder 209.

Referring to FIG. 2, the digital signal processor 201 processes a digital signal of a video frame stream input thereto. That is, the digital signal processor 201 detects each frame from the stream to output the detected frame to the parental level detector 205. Here, as illustrated in FIG. 1, each frame includes the frame sequence number field 101, the frame parental level field 103, the next frame sequence number field 105, and the coded data.

The user input unit 203 includes keys for inputting numbers or character information, and function keys for setting various functions. The user input unit 203 outputs a parental level set by a user to the parental level detector 205 according to an exemplary embodiment of the present invention. Though not shown, the user apparatus includes an output unit, such as a speaker and a display unit, for outputting an image and voice for viewing by the user.

The parental level detector 205 detects a frame parental level from a header of a frame input from the digital signal processor 201, and compares the detected parental level with the parental level from the user input unit 203 to determine a next frame sequence frame number. At this point, when the set parental level is less than or equal to the parental level of the frame, the parental level detector 205 determines a next frame sequence number field value set in a header of the relevant frame and outputs the same to the frame sequencer 207. When a parental level is not recorded within the header of a frame, the parental level detector 205 outputs, as a next frame sequence number, the frame sequence number of the frame that is subsequent to the current frame to the frame sequencer 207.

The frame sequencer 207 receives frames sequentially processed by the digital signal processor 201, and realigns the received frames according to frame sequence numbers from the parental level detector 205 to output the frames to the decoder 209. At this point, the frame sequencer 207 detects coded data from the realigned frames to output the detected coded data to the decoder 209.

The decoder 209 decodes the coded data from the frame sequencer 207, realigned to be appropriate for the parental level to output the decoded data to the output unit for viewing by the user.

Figure 3:
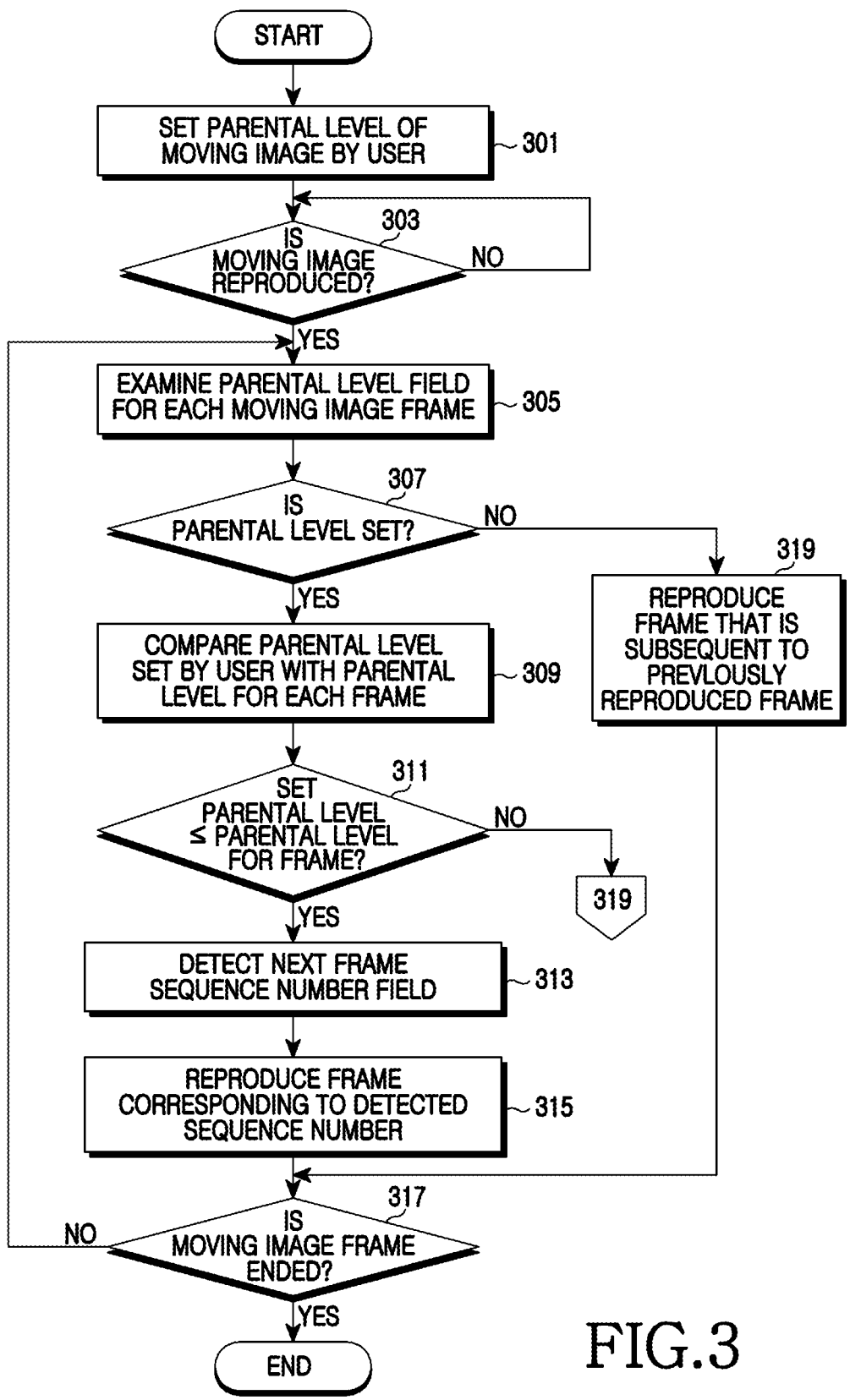
FIG. 3 is a flowchart illustrating a procedure for reproducing a moving image based on a parental level according to an exemplary embodiment of the present invention.

FIG. 3 is a flowchart illustrating a procedure for reproducing a moving image based on a parental level according to an exemplary embodiment of the present invention.

Referring to FIG. 3, in step 301, the user apparatus allows a user to set a moving image parental level, and in step 303, determines whether a moving image is to be reproduced.

When the moving image is to be reproduced, the user apparatus processes a digital signal of a video frame stream and examines a parental level field within a header of each frame in step 305. Next, in step 307, the user apparatus determines whether a parental level is set in the parental level field.

When the parental level is not set in the parental level field, the user apparatus reproduces a frame corresponding to the next frame sequence number of a previous reproduction frame in step 319. Here, when the frame is a first frame of the moving image, the first frame is reproduced. Next, the user apparatus performs step 317 which is described further below.

Alternatively, when it is determined in step 307 that the parental level is set in the parental level field of the moving image frame, the user apparatus performs step 309 to compare a parental level set by the user with the parental level of the frame. In step 311, the user apparatus determines whether the set parental level is less than or equal to the parental level of the frame.

When the set parental level is less than or equal to the parental level of the frame, the user apparatus detects a next frame sequence number field value included within the frame in step 313, and then in step 315, reproduces a frame corresponding to the detected next frame sequence number. For example, assuming that the user apparatus is set to PG-13 of Table 1 as a parental level, when the moving image frames illustrated in FIG. 1 are reproduced, PG-13 is set as a parental level in a frame parental level field of the 107-th frame, which is a first frame, and 110 is designated in the next frame sequence number field, so that the user apparatus reproduces data of the 110-th frame.

When the condition of step 311 is not met, the user apparatus performs step 319.

In step 317, the user apparatus determines whether the reproducing of the moving image frames is ended. When the reproducing of the moving image frames is not ended, the user apparatus returns to step 305 to perform subsequent steps. On the other hand, when the reproducing of the moving image frames is ended, the user apparatus ends the algorithm according to an exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

What is claimed is:

1. An apparatus for reproducing a moving image according to a parental level, the apparatus comprising:
    a digital processor for digital-processing a video frame stream to detect frames;
    a parental level detector for determining whether a parental level is set in each detected frame, and when the parental level is set, for determining a frame sequence number of a frame to be reproduced next using a next frame sequence number set in the frame, and
    a user input unit for inputting a parental level by a user,
    wherein a header that is included in each of the detected frames includes a parental level field for indicating the parental level, and
    wherein the parental level detector compares the parental level set in the frame with the input parental level, and when the input parental level is equal to or lower than the parental level of the frame, determines the frame to be reproduced next using the next frame sequence number set in the frame.

2. The apparatus of claim 1, further comprising a frame sequencer for aligning frames of the video frame stream using frame sequence numbers from the parental level detector.

3. The apparatus of claim 2, further comprising a decoder for decoding coded data of the aligned frames from the frame sequencer to output the decoded data to an output unit.

4. The apparatus of claim 1, wherein a header of the frame comprises at least one of a field for setting a parental level and a field for setting a frame sequence number of a frame to be reproduced next according to the set parental level.

5. The apparatus of claim 1, wherein, when the parental level of the frame is not set, the parental level detector determines a frame subsequent to the frame as the frame to be reproduced next.

6. The apparatus of claim 1, wherein the parental level detector compares the parental level set in the frame with the input parental level, and when the two parental levels are the same, determines the frame to be reproduced next using the next frame sequence number set in the frame.

7. A method for reproducing a moving image according to a parental level in a user apparatus, the method comprising:
    digital-processing a video frame stream to detect frames;
    determining whether a parental level is set in each detected frame;
    when the parental level is set, determining a frame sequence number of a frame to be reproduced next using a next frame sequence number set in the frame, and
    inputting a parental level from a user to set an input parental level,
    wherein a header that is included in each detected frame includes a parental level field for indicating the parental level, and
    wherein the determining of the frame to be reproduced next comprises:
        comparing the parental level set in the frame with the input parental level input; and
        when the input parental level is equal to or lower than the parental level of the frame, determining the frame to be reproduced next using the next frame sequence number set in the frame.

8. The method of claim 7, further comprising aligning frames of the video frame stream using determined sequence numbers.

9. The method of claim 8, further comprising decoding coded data of the aligned frames for output to an output unit.

10. The method of claim 7, wherein a header of the frame comprises a field for setting a parental level and a field for setting a frame sequence number of a frame to be reproduced next according to the set parental level.

11. The method of claim 8, further comprising, when the parental level of the frame is not set, determining a frame subsequent to the frame as the frame to be reproduced next.

12. The method of claim 7, wherein the determining of the frame to be reproduced next comprises:
    comparing the parental level set in the frame with the input parental level; and
    when the two parental levels are the same, determining the frame to be reproduced next using the next frame sequence number set in the frame.

* * * * *